US007564025B2

(12) United States Patent
Crawford

(10) Patent No.: US 7,564,025 B2
(45) Date of Patent: Jul. 21, 2009

(54) MULTIPOLE DEVICES AND METHODS

(75) Inventor: Robert K. Crawford, Palo Alto, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 330 days.

(21) Appl. No.: 11/680,617

(22) Filed: Feb. 28, 2007

(65) Prior Publication Data

US 2008/0203287 A1 Aug. 28, 2008

(51) Int. Cl.
*H01J 49/42* (2006.01)
*B01D 59/44* (2006.01)

(52) U.S. Cl. ....................... 250/282; 250/292; 250/290; 250/281; 250/396 R; 250/423 R

(58) Field of Classification Search ................. 250/282, 250/281, 292, 290, 396 R, 423 R
See application file for complete search history.

(56) References Cited

U.S. PATENT DOCUMENTS

| | | | | |
|---|---|---|---|---|
| 6,417,511 | B1 * | 7/2002 | Russ et al. | 250/292 |
| 2006/0169890 | A1 * | 8/2006 | Crawford et al. | 250/290 |

* cited by examiner

*Primary Examiner*—Nikita Wells

(57) ABSTRACT

The present invention provides, inter alia, a multipole ion guide for moving and guiding ions, particularly in a mass spectrometer. The multipole ion guide comprises multiple rods with a resistive coating, and radio frequency (RF) and direct current (DC) voltages applying to the resistive coating of each rod. Devices and systems comprising the multipole ion guide, as well as methods of use thereof, are also provided.

20 Claims, 3 Drawing Sheets

MULTIPOLE DEVICES AND METHODS

BACKGROUND OF THE INVENTION

In mass spectrometry, ions are often transported in ion guides within a mass spectrometer (MS) system. The guides are usually devices employing multipole fields to confine the ions along an axis as they pass through the various stages of the instrument.

Without ion guides, many or most of the ions would be lost. If the ions are subjected to collisions with gas molecules for translational cooling and focusing, or for fragmentation, even the multipole ion guides may not be effective in preventing ion losses. The state of the art solution to problems of ion losses and delays in these circumstances is to provide an electric field along the axis of ion motion (axial electric field) in addition to the multipole confinement field.

One class of MS called a tandem mass spectrometer provides an important example. In those instruments (parent) ions are usually selected in a first mass analyzer and then subjected to fragmentation in a collision cell to generate product (daughter) ions. The products are analyzed in a second mass analyzer. When the product ions are formed, they usually have very low kinetic energies, so they are either delayed in passage to the second mass analyzer or many are lost altogether. These problems can be reduced or avoided by applying an electric field directed along the axis of the collision cell to accelerate the slow ions and keep them moving to the exit of the cell and the second mass analyzer.

Methods for producing such axial fields have been described (U.S. Pat. Nos. 4,126,781; 4,283,626; and 5,847,386). However, most means in the art for creating axial fields are somewhat complex, involving multiple layers of resistive materials, insulators and conductors, or complex electrode arrangements that are not easily constructed and aligned. A simpler device with an axial field would be desirable and useful. These and other problems in the art have been addressed by the present invention.

DETAILED DESCRIPTION

Figure 1:
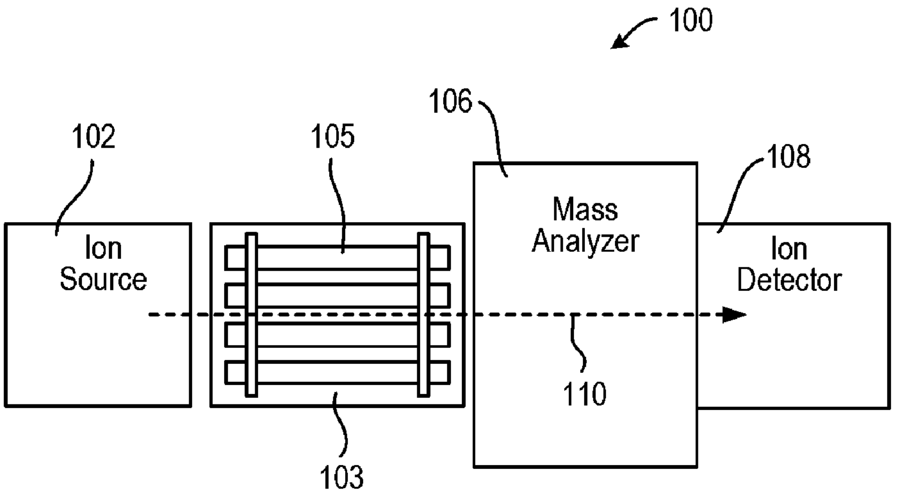
FIG. 1 shows an example of a MS system of the present invention.

The invention provides a mass spectrometer system, comprising an ion source for producing ions; a multipole ion guide downstream from the ion source for confining and guiding ions along a central longitudinal axis, comprising a first rod set with each rod having a resistive coating and first and second ends; a second rod set adjacent to the first rod set with each rod having a resistive coating, and first and second ends; an RF voltage source for supplying an RF voltage to the resistive coatings of the first rod set with a first phase and to the resistive coatings of the second rod set with a different phase; and a DC voltage source connected to the resistive coatings for producing a potential difference between the first end of each rod and the second end of each rod to create an axial field along the central longitudinal axis of the multipole ion guide; wherein the RF voltage source and the DC voltage source define an RF field and an axial DC field, respectively, that confine and guide ions along the central longitudinal axis of the multipole ion guide; a mass analyzer downstream from the multipole ion guide; and an ion detector downstream from the mass analyzer for detecting the ions.

The invention also provides a multipole ion guide for confining and guiding ions along a central longitudinal axis, comprising a first rod set with each rod having a resistive coating and first and second ends; a second rod set adjacent to the first rod set with each rod having a resistive coating, and first and second ends; an RF voltage source for supplying an RF voltage to the resistive coatings of the first rod set with a first phase and to the resistive coatings of the second rod set with a different phase; and a DC voltage source connected to the resistive coatings for producing a potential difference between the first end of each rod and the second end of each rod to create an axial field along the central longitudinal axis of the multipole ion guide; wherein the RF voltage source and the DC voltage source define an RF field and an axial DC field, respectively, that confine and guide ions along the central longitudinal axis. This device can be used, for example, as an ion guide (for example, between an ion source and a mass analyzer), in a collision cell, or in a linear ion trap.

The invention also provides a method of moving and guiding ions using a multipole ion guide, comprising applying an RF and a DC voltage to the resistive coating of a first set of rods; applying an RF and a DC voltage to the resistive coating of a second set of rods; and creating an RF and an axial DC field along the rods for guiding and moving the ions. The method does not require the transmission of RF or DC via a conductor in the multipole ion guide, although in some embodiments, a conducting piece can be included in the rods to facilitate the connection between the rods and the RF or DC source. In addition, in some embodiments, segmented rods are employed, which may contain conducting materials in some of the segments, but not all the segments, of at least one rod.

The details of one or more embodiments of the invention are set forth in the accompanying drawings and the description below. Other features, objects, and advantages of the invention will be apparent from the description and drawings, and from the claims.

Prior to describing the invention in further detail, the terms used in this application are defined as follows unless otherwise indicated.

Definition

As used in this specification and the appended claims, the singular forms "a," "an," and "the" include plural referents unless the context clearly dictates otherwise. Thus, for example, reference to "a chamber" may include more than one chamber. Reference to "an ion source" may include more than one ion sources.

The term "adjacent" means near, next to, or adjoining.

The term "resistive material" refers to any material that provides electrical resistivity. The resistive material may be, for example, a deposited coating, a resistive ink, or a resistive surface formed by a chemical reaction.

The term "coating" refers to a layer of material on the surface of an object.

The term "rod" shall refer to a body that may have any cross sectional shape. The drawings in this application show rods having a circular cross section. This is for illustrative purposes only and the invention should not be interpreted to be limited to these embodiments. For instance, the cross sectional shape could be circular, semi-circular, concave, oval, flat, square, rectangular, hyperbolic, etc. In addition, ion guides may comprise flat plates and the invention can be used with this type of structure as well for the production of axial fields.

The term "tandem" refers to one device following another sequentially. The devices or components need not be integrated and in certain instances may be spaced in sequential alignment.

Devices and Methods

Referring to FIG. 1, the details of the present invention will now be discussed. FIG. 1 illustrates an example of a mass spectrometer (MS) system 100 that incorporates the present invention. The MS system 100 comprises an ion source 102, a chamber 103 containing a multipole device 105 of the invention, a conventional mass analyzer 106 and an ion detection system 108. In the present example the multipole device 105 guides the ions from the source 102 to the mass analyzer 106 in an ion beam 110. The pressure in the device 105 may be high enough that the ions suffer multiple collisions, and an axial field (not shown) produced by the device helps prevent ion losses due to those collisions (vacuum chambers and associated equipment area not shown in this representation).

Figure 2:
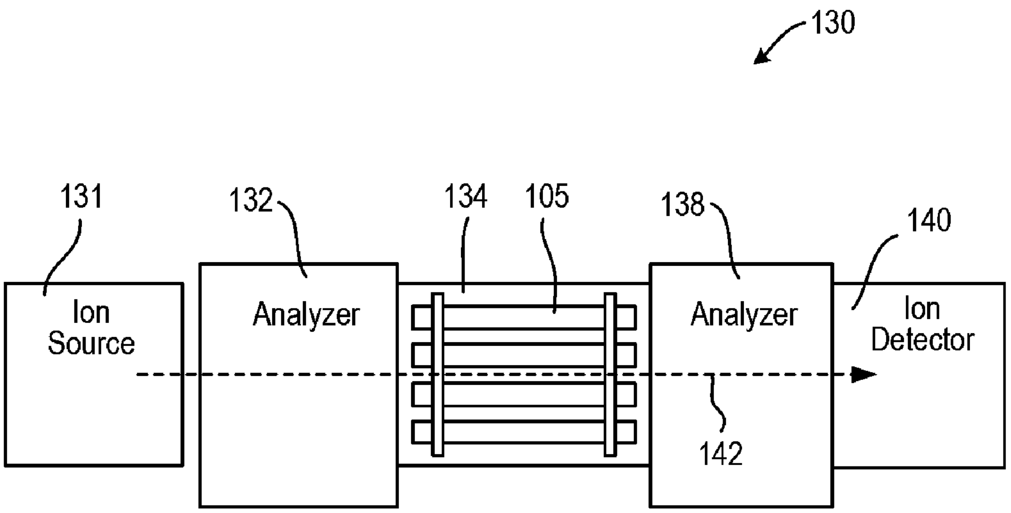
FIG. 2 shows an example of a tandem MS system of the present invention.

FIG. 2 shows another embodiment of the present invention in a tandem MS system. In this case, a tandem MS system 130 is defined. The term tandem refers to one mass analyzer in sequential alignment with another mass analyzer. The term should be interpreted broadly and comprises the situation where one mass analyzer follows directly from another mass analyzer or where they are spaced apart. In this embodiment of the present invention the multipole ion guide 105 of the present invention is employed in a collision cell 134. The tandem MS system 130 comprises an ion source 131, a first mass analyzer 132, the collision cell 134, a second mass analyzer 138 and an ion detector 140. Note that each element is understood to comprise appropriate vacuum chambers when necessary. Ions from the ion source 131 are selected as parent ions in the first mass analyzer 132 and pass into the collision cell 134 for fragmentation. A collision gas (e.g., nitrogen or argon) is present in the collision cell 134. The parent ions acquire sufficient energy for fragmentation upon collision with gas molecules by acceleration by a potential difference between the first mass analyzer 132 and the multipole ion guide 105, or by acceleration with the axial field in multipole ion guide 105, according to the present invention. After fragmentation, product ions are assisted by the axial field to proceed along the axis 142 of ion flow into the second mass analyzer 138, where particular species are selected and passed into the ion detector system 140.

Figure 3:
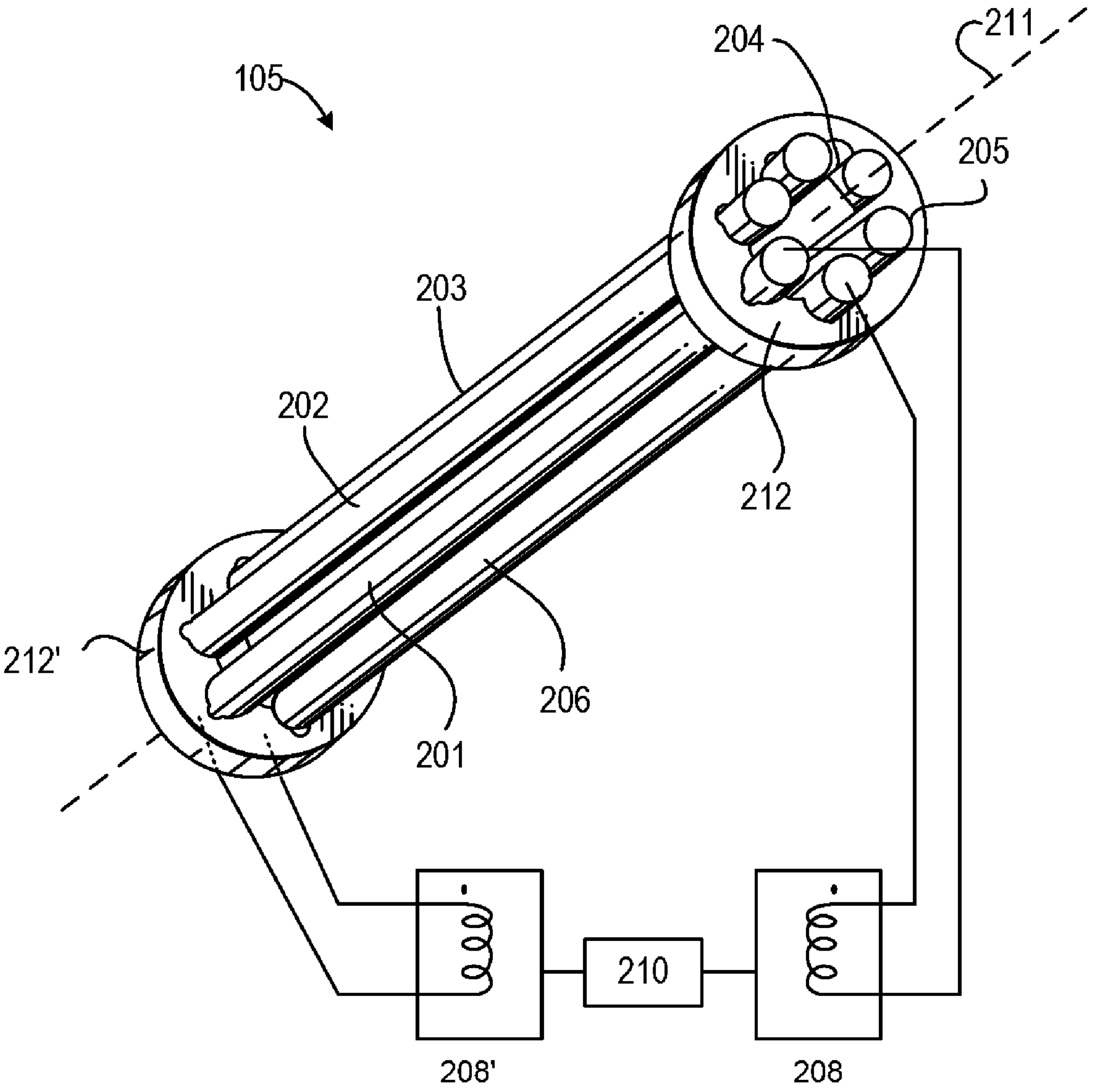
FIG. 3 shows an example of a typical multipole ion guide of the present invention.

Referring to FIG. 3, in the simplest terms the invention provides a multipole device 105. In this case the multipole device 105 is shown as a hexapole. Other rod combinations including and not limited to quadrupole, octopole, etc., may be employed with the present invention. The rods 201-206 are held in proper geometrical relationship by insulating rings 212 and 212'. The rods 201, 203 and 205 constitute a first rod set. The rods 202, 204 and 206 constitute a second rod set. Each rod set may comprise two, three, four, five, six, seven, or more rods.

Ions are injected into the device 105 near the first ends of the rod set held by insulator 212, proceed along axis 211, then exit near the second ends held by insulator 212'. An RF voltage is applied by an RF voltage source (shown as 208 and 208') to the resistive coatings of rod sets (201, 203, 205) and (202, 204, 206) with two phases differing by, for example, 180°. For simplicity, FIG. 3 does not show the connection of the RF source 208, 208' to every rod, although the RF source 208, 208' is connected to every rod. A DC voltage source 210 electrically connects the first end of each rod to its second end. Connections are made to each resistive coating. However, it is contemplated that a conductor piece, such as a metal cap, may be attached to the rods to facilitate connections. Again, FIG. 3 does not show the connection to each and every rod. Similar types of electrical connections are provided for ion guides with different number of rods, such as quadrupole and octopole devices. However, in these situations the rods are grouped into sets of two and four, respectively. In other words the electrical connections are provided for each rod set and supplied with RF voltage in different phases. This electrical connection and design provide for alternating phase of each of the adjacent rods (as shown in FIG. 3). The rods may also be connected to the RF and DC sources in other configurations that would be apparent to people of ordinary skill in the art.

In the simplest terms, the invention provides a multipole device 105 wherein the rods are insulating and have thin resistive coatings along their length. In addition, in certain embodiments part of the rod(s) may actually comprise a resistive material. For example, the rod(s) may be a solid resistive rod wherein the entire rod, including the exterior and interior, is resistive. The rod(s) may also be a resistive tube with a hollow center. As discussed above the DC voltage source 210 provides a DC potential difference. The DC potential difference is applied to the coating of each rod at the resistive material. A resulting voltage gradient is established along the rods creating an electric field parallel to the rods. The resultant electric field is directed along the central axis 211 of the multipole device 105 and accelerates or decelerates ions within the device, depending upon the polarity of the DC voltages. As discussed above, the RF voltage source 208, 208' applies an RF voltage. RF voltages are applied to the rods (i.e. to the resistive coatings of each rod) in the usual manner, with adjacent rods differing in phase (e.g., by 180°).

Different from other devices and guides, the present devices apply both RF and DC voltages to the resistive coatings, and the resistive material is responsible for transmitting both the RF and DC. It has not been recognized that the RF voltage can be applied to a resistive material; in fact, it was thought that the RF field could only be applied to a conductor. Thus, other approaches which have used a resistive coating also have a conductive layer, tube or rod in addition to the resistive coating (as well as an insulating layer between the resistive layer and the conductive layer), and the RF voltage is applied to the conductive layer, tube or rod. The present invention provides a much simpler approach, wherein no conductor is required in the rods.

Figure 4:
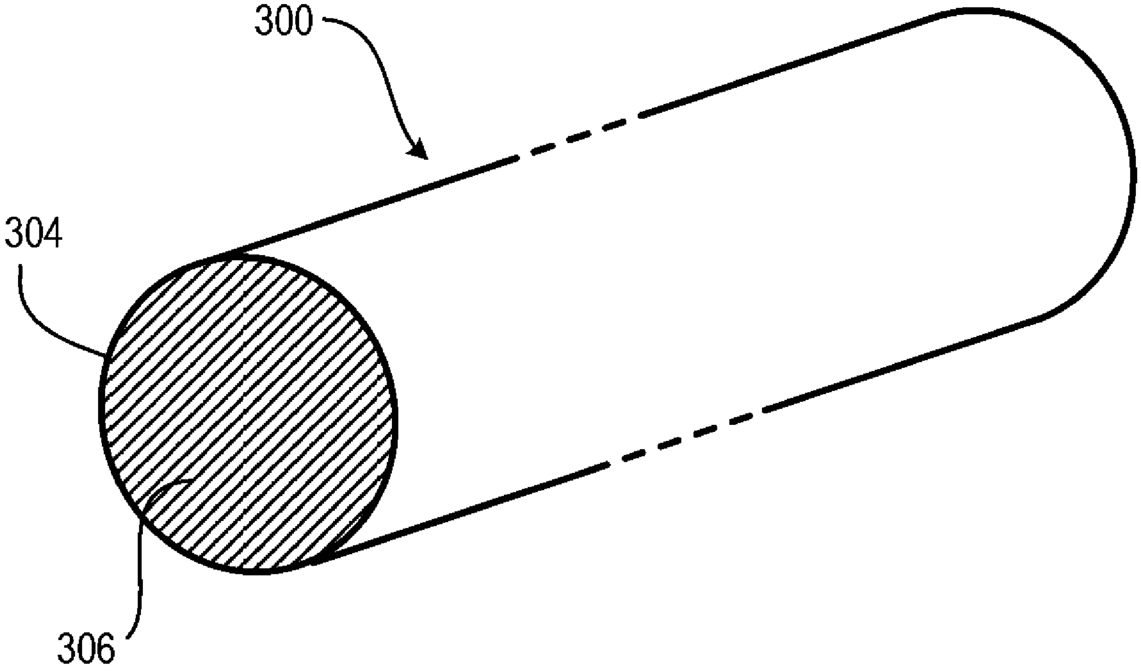
FIG. 4 shows a schematic representation of an exemplary rod of the present invention.

FIG. 4 shows a schematic view of an exemplary rod 300 according to the present invention. It is shown as a cylindrical rod, though other shapes are within the scope of the invention. The rod 300 comprises an optional insulating core rod 306 with a resistive coating 304. The resistive coating 304 is usually of small thickness compared with the diameter of core rod 306, but that is not a necessary constraint of the present invention. As discussed above, a resistive rod, tube, or plate without an insulating core, is within the scope of the invention.

The resistive coating 304 need not coat the entire surface of the core rod 306. However, the surface of the rod that faces the axis of the multipole device 105 should be covered by the resistive coating 304. In general, insulating surfaces should not be exposed to ions because of resultant undesirable charging, so half or more of the circumference of the core rod 306 should be coated. However, if the conductivity of the core material is sufficiently lower than that of the "good" insulators (quartz, Teflon® etc.), charging will not occur.

Typically, multipole devices 105 that may incorporate the invention have overall lengths of 2 to 40 cm (for example, about 2-5, 5-7.5, 7.5-10, 10-15, 15-20, 20-25, 25-30, 30-35 or 35-40 cm) and have rods that define an inner passage having an inscribed diameter of 2 to 30 mm (for example, about 2-4,4-6,6-8,8-10, 10-12, 12-14, 14-16, 16-18, 18-20, 20-22, 22-24, 24-26, 26-28, or 28-30 mm). A range of typical rod diameters (for circular rods) is 0.5 to 20 mm (such as about 0.5-1, 1-2, 2-4, 4-6, 6-8, 8-10, 10-12, 12-14, 14-16, 16-18, or 18-20 mm). Dimensions outside these ranges may also be useful in some applications.

It should be further noted that multipole rods can be segmented within a given ion guide device. Segmentation can also be achieved by segmenting the coating on a single rod. In that case, it is useful to have core rods that are partially conducting so as to avoid charging effects. Segmented rods are used in the invention to create regions of differing axial electric fields. These regions can be used for different purposes in the same device, e.g., fragmentation in one region, ion assist acceleration in another, trapping of ions in a portion of the guide (wherein the axial field bounding the trapping region serves as a reflecting boundary of the trap), etc.

The end to end rod resistance is determined by the resistivity of the material of the coating, the cross sectional area of the coating, and its thickness in the manner known in the art. The desired voltage drop along a rod will usually be in the range of 0.5V to 100 V (although voltage drops outside this range are within the scope of the invention). A typical voltage drop for ion transport assist is 10V. In some embodiments, the voltage drop for ion transport assist is less than 7 volts DC, whereas the RF (p-p) amplitude is several hundred volts. A typical end to end rod resistance (of the coating) is 400 ohms, and typical capacitance (set-to-set) is 50 picofarads between phases. Preferably, the end-to-end resistance of each rod ranges from 4000 to 40 ohms. However, increasing resistance leads to diminishing RF fields within the multipole at its midspan compared to the fields near its ends. On the other hand, low resistance increases power load on the DC supply and rod heating. Exemplary end-to-end resistance ranges include, without being limited to, about 300-500, 200-600, 100-700, 100-1000, 100-1500, 100-2000, 100-3000, 80-800, 80-1000, 80-2000, 60-600, 60-1000 and 60-2000 ohms.

Typical currents driven through the resistive coatings by the DC power supply 210 usually range from a few microamperes to tens of milliamperes, although currents outside that range are also useful. It is usually advantageous to use currents that are low enough to avoid significant heating of the resistive coatings yet high enough that stray ion current to the coatings is insignificant in comparison.

Many materials are suitable for resistive coating 304. Considerations are resistivity, durability, vacuum compatibility and ease of manufacture. Examples are resistive inks (carbon, cermet, polymer, etc), metallic oxides, doped glasses, metal films, ferrite compounds (useful especially if the embodiment is simply a resistive tube), etc. Carbon resistive inks (e.g., C-100 or C-200 or the like) have proven useful. It is also possible to generate a resistive coating on a glass surface by, for example, chemical reactions (U.S. Pat. No. 7,081,618).

In some embodiments, the present invention provides a method of moving and guiding ions using a multipole ion guide, comprising applying an RF and a DC voltage to the resistive coating of a first set of rods; applying an RF and a DC voltage to the resistive coating of a second set of rods; and creating an RF and axial DC field along the rods for moving and guiding the ions.

For example, ions may be created by the ion source 102 in the standard MS system 100, or ion source 131 in the tandem MS system 130. Any number of ion sources known in the art may be employed to create the ions. The ion source may comprise a matrix assisted laser desorption ionization source (MALDI), an atmospheric pressure matrix assisted laser desorption ionization source (AP-MALDI), an electrospray source (ESI), an electron impact ion source (EI), a chemical ionization source (CI), an atmospheric pressure photoionization source (APPI), or any other ion source (or combination of ion sources) known in the art for producing ions.

After the ions are produced, they are then either passed to a mass analyzer 132 for further processing or directly to the multipole ion guide 105. The multipole ion guide 105 both directs and moves the ions along a central axis 211 (See FIG. 3). The RF voltage source 208, 208' applies a voltage to the first and second set of rods. The first set of rods receives an RF voltage with a first phase. The second set of rods receives an RF voltage with a second phase. Typically, the second rod set receives an RF voltage that is phase shifted 180 degrees from the RF voltage of the first set of rods. The RF voltage source creates a transverse, multipole RF field which confines the ions to a space along the central axis 211. The DC voltage source 210 provides a DC voltage. In this case scenario the DC voltage source 210 provides a voltage source that creates an axial DC field. The axial field directs ions along the central axis 211 and may accelerate or decelerate them.

After the ions travel along the central axis 211, they exit into the mass analyzer 106 or the mass analyzer 138 (in the tandem mass spectrometer example). The ions are then detected by the ion detector 108 or 140.

Thus, some embodiments of the present invention provide a multipole ion guide for confining and guiding ions along a central longitudinal axis, comprising:

(a) a first rod set with each rod having a resistive coating and first and second ends;

(b) a second rod set adjacent to the first rod set with each rod having a resistive coating, and first and second ends;

(c) a radio frequency (RF) voltage source for supplying an RF voltage to the resistive coatings of the first rod set with a first phase and to the resistive coatings of the second rod set with a different phase; and (d) a direct current (DC) voltage source connected to the resistive coatings for producing a potential difference between the first end and the second end of each rod to create an axial field along the central longitudinal axis of the multipole ion guide.

In the multipole ion guide of this invention, the RF voltage applied to the second rod set may optionally be phase shifted 180 degrees from the RF voltage applied to the first rod set. In some embodiments, all the rods are parallel. The multipole ion guide of the present invention may comprise at least one segmented rod. In some embodiments, all the rods contain a segment of outer conductive coating in the middle of the rods. In some embodiments, the resistive coating may cover only a portion of any of the rods. In some embodiments, at least one rod in the first set or second set is entirely covered by the resistive coating. The number of rods in the rod sets may be any number that is practical. For example, the first set of rods may comprise 2, 3, 4, 5 or 6 rods, and the second set of rods comprises the same number of rods as the first set.

Another aspect of the present invention provides a mass spectrometer system, comprising:

(a) an ion source for producing ions;

(b) a multipole ion guide as described herein downstream from the ion source;

(c) a mass analyzer downstream from the multipole ion guide; and (d) an ion detector downstream from the mass analyzer.

The mass spectrometer system may have any ion source or combination of ion sources, such as an electrospray or matrix assisted laser desorption ionization (MALDI) ion source. Similarly, the mass spectrometer system may have any mass analyzer or combination of mass analyzers. The mass spectrometer system may optionally comprise a device to separate the components in a sample, such as a liquid chromatography column, a gas chromatography column, a capillary electrophoresis device, or other devices known in the art for this purpose.

In some embodiments, the mass spectrometer system is a tandem mass spectrometer system, comprising:

(a) an ion source for producing ions;

(b) a first mass analyzer adjacent the ion source for selecting the ions;

(c) a multipole ion guide as described in this disclosure, downstream from the first mass analyzer;

(d) a second mass analyzer downstream from the multipole ion guide for analyzing the ions; and (e) an ion detector downstream from the second mass analyzer.

The tandem mass spectrometer system may have any combination of mass analyzers. For example, the first and second mass analyzers may be selected, independently, from the group consisting of quadrupole, ion trap, orbital trap, magnetic sector, time-of-flight, and fourier transform-ion cyclotron resonance (FT-ICR) mass analyzers. Other mass analyzers are also within this invention. Like other mass spectrometer systems of this invention, the tandem mass spectrometer systems may comprise any ion source or combination of ion sources.

Other embodiments of the present invention provide, for example, methods of moving and guiding ions using the multipole ion guides of this invention, such as a method comprising:

(a) applying an RF voltage to a resistive coating of a first set of rods in a first phase and to a resistive coating of a second set of rods in a different phase, to create an RF field; and (b) applying a DC voltage to the resistive coatings of the first and second sets of rods to produce a voltage potential between the ends of each rod to form an axial field;

wherein the RF field and the axial field confine and guide ions along the central longitudinal axis of all the rods.

The present invention also provides methods of analyzing a sample using a mass spectrometer system described herein, for example, a method comprising applying a sample to the mass spectrometer system of the present invention, and obtaining data of the mass analysis.

All of the publications, patents and patent applications cited in this application are herein incorporated by reference in their entirety to the same extent as if the disclosure of each individual publication, patent application or patent was specifically and individually indicated to be incorporated by reference in its entirety.

A number of embodiments of the invention have been described. Nevertheless, it will be understood that various modifications may be made without departing from the spirit and scope of the invention.

The invention claimed is:

1. A multipole ion guide for confining and guiding ions along a central longitudinal axis, comprising:

(a) a first rod set with each rod having a resistive coating and first and second ends;

(b) a second rod set adjacent to the first rod set with each rod having a resistive coating, and first and second ends;

(c) a radio frequency (RF) voltage source for supplying an RF voltage to the resistive coatings of the first rod set with a first phase and to the resistive coatings of the second rod set with a different phase; and (d) a direct current (DC) voltage source connected to the resistive coatings for producing a potential difference between the first end and the second end of each rod to create an axial field along the central longitudinal axis of the multipole ion guide.

2. A multipole ion guide as recited in claim 1, wherein the RF voltage applied to the second rod set is phase shifted 180 degrees from the RF voltage applied to the first rod set.

3. A multipole ion guide as recited in claim 1, wherein at least one of the rods is segmented.

4. A multipole ion guide as recited in claim 1, wherein the first set of rods comprises 2, 3, 4, 5 or 6 rods, and the second set of rods comprises the same number of rods as the first set.

5. A mass spectrometer system, comprising:

(a) an ion source for producing ions;

(b) a multipole ion guide as recited in claim 1 downstream from the ion source;

(c) a mass analyzer downstream from the multipole ion guide; and (d) an ion detector downstream from the mass analyzer.

6. A mass spectrometer system as recited in claim 5, wherein the RF voltage applied to the second rod set is phase shifted 180 degrees from the first RF voltage applied to the first rod set.

7. A mass spectrometer system as recited in claim 5, wherein at least one of the rods is segmented.

8. A mass spectrometer system as recited in claim 5, wherein the first set of rods comprises 2, 3, 4, 5 or 6 rods, and the second set of rods comprises the same number of rods as the first set.

9. The mass spectrometer system as recited in claim 5, wherein the ion source is an electrospray or matrix assisted laser desorption ionization (MALDI) ion source.

10. A tandem mass spectrometer system, comprising:

(a) an ion source for producing ions;

(b) a first mass analyzer adjacent the ion source for selecting the ions;

(c) a multipole ion guide as recited in claim 1 downstream from the first mass analyzer;

(d) a second mass analyzer downstream from the multipole ion guide for analyzing the ions; and (e) an ion detector downstream from the second mass analyzer.

11. A tandem mass spectrometer system as recited in claim 10, wherein the RF voltage applied to the second rod set is phase shifted 180 degrees from the first RF voltage applied to the first rod set.

12. A tandem mass spectrometer system as recited in claim 10, wherein at least one of the rods is segmented.

13. A tandem mass spectrometer system as recited in claim 10, wherein the first set of rods comprises 2, 3, 4, 5 or 6 rods, and the second set of rods comprises the same number of rods as the first set.

14. A tandem mass spectrometer system as recited in claim 10, wherein the first and second mass analyzers are selected, independently, from the group consisting of quadrupole, linear ion trap, magnetic sector, time-of-flight, and fourier transform-ion cyclotron resonance (FT-ICR) mass analyzers.

15. A tandem mass spectrometer system as recited in claim 10, wherein the first and second mass analyzers are both quadrupole mass analyzers.

16. The tandem mass spectrometer system as recited in claim 10, wherein the ion source is an electrospray or matrix assisted laser desorption ionization (MALDI) ion source.

17. A method of moving and guiding ions using a multipole ion guide, comprising:

(a) applying an RF voltage to a resistive coating of a first set of rods in a first phase and to a resistive coating of a second set of rods in a different phase, to create an RF field; and (b) applying a DC voltage to the resistive coatings of the first and second sets of rods to produce a voltage potential between the ends of each rod to form an axial field;

wherein the RF field and the axial field confine and guide ions along the central longitudinal axis of all the rods.

18. The method of claim 17, wherein the RF voltage applied to the second rod set is phase shifted 180 degrees from the RF voltage applied to the first rod set.

19. The method of claim 17, wherein at least one of the rods is segmented.

20. The method of claim 17, wherein the first set of rods comprises 2, 3, 4, 5 or 6 rods, and the second set of rods comprises the same number of rods as the first set.

* * * * *